(12) United States Patent
Sarpatwar et al.

(10) Patent No.: US 11,271,958 B2
(45) Date of Patent: Mar. 8, 2022

(54) EFFICIENT UNSUPERVISED ANOMALY DETECTION ON HOMOMORPHICALLY ENCRYPTED DATA

(71) Applicant: International Business Machines Corporation, Armonk, NY (US)

(72) Inventors: Kanthi Sarpatwar, Elmsford, NY (US); Venkata Sitaramagiridharganesh Ganapavarapu, Peekskill, NY (US); Saket Sathe, Mohegan Lake, NY (US); Roman Vaculin, Larchmont, NY (US)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 16/577,038

(22) Filed: Sep. 20, 2019

(65) Prior Publication Data

US 2021/0092137 A1    Mar. 25, 2021

(51) Int. Cl.
*H04L 29/06* (2006.01)
*G06F 16/22* (2019.01)
(Continued)

(52) U.S. Cl.
CPC ...... *H04L 63/1425* (2013.01); *G06F 16/2246* (2019.01); *G06F 21/602* (2013.01);
(Continued)

(58) Field of Classification Search
CPC . H04L 63/1425; H04L 9/008; G06F 16/2246; G06F 21/602; G06N 20/00; G06N 7/005
See application file for complete search history.

(56) References Cited

U.S. PATENT DOCUMENTS 8,626,749 B1    1/2014  Trepetin et al.
10,902,062 B1 *  1/2021  Guha .................... G06N 5/003
(Continued)

FOREIGN PATENT DOCUMENTS

CN    105468362 A    4/2016
WO    2017187207 A1   11/2017
WO    2018089318 A1    5/2018

OTHER PUBLICATIONS

Zhang et al., "A Novel Privacy-preserving Distributed Anomaly Detection Method", pp. 1-6, 2017 International Conference on Security, Pattern Analysis, and Cybernetics (SPAC) (Year: 2017).*
(Continued)

*Primary Examiner* — Hee K Song
(74) *Attorney, Agent, or Firm* — Patterson + Sheridan, LLP (57) ABSTRACT

Aspects of the present disclosure describe techniques for detecting anomalous data in an encrypted data set. An example method generally includes receiving a data set of encrypted data points. A tree data structure having a number of levels is generated for the data set. Each level of the tree data structure generally corresponds to a feature of the encrypted plurality of features, and each node in the tree data structure at a given level represents a probability distribution of a likelihood that each data point is less than or greater than a split value determined for a given feature. An encrypted data point is received for analysis, and anomaly score is calculated based on a probability identified for each of the plurality of encrypted features. Based on determining that the calculated anomaly score exceeds a threshold value, the encrypted data point is identified as potentially anomalous.

20 Claims, 5 Drawing Sheets

(51) Int. Cl.
  *G06N 20/00* (2019.01)
  *G06F 21/60* (2013.01)
  *G06N 7/00* (2006.01)
  *H04L 9/00* (2022.01)

(52) U.S. Cl.
  CPC ............. *G06N 7/005* (2013.01); *G06N 20/00* (2019.01); *H04L 9/008* (2013.01)

(56) References Cited

U.S. PATENT DOCUMENTS

| | | |
|---|---|---|
| 2008/0114991 A1 | 5/2008 | Jonas |
| 2014/0003647 A1 | 1/2014 | Liu |
| 2016/0014038 A1 | 1/2016 | Thyagarajan et al. |
| 2017/0199902 A1* | 7/2017 | Mishra ................. G06F 16/215 |
| 2018/0152841 A1 | 5/2018 | Shah et al. |
| 2018/0189667 A1* | 7/2018 | Tsou ..................... G06N 20/20 |
| 2020/0265119 A1* | 8/2020 | Desai ................... G06K 9/6226 |

OTHER PUBLICATIONS

PCT Notificataion of the Transmittal of the International Search Report and the Written Opinion of the International Searching Authority, or the Declaration for Application No. PCT/IB2020/056732 dated Nov. 3, 2020.

Saputro et al., "Performance evaluation of smart grid data aggregation via homomorphic encryption." 2012 IEEE Wireless Communications and Networking Conference (WCNC), 6 pages.

Li et al. "A privacy-preserving high-order neuro-fuzzy c-means algorithm with cloud computing." Neurocomputing 256 (2017): 82-89.

Kumar et al., "A survey of security concerns in various data aggregation techniques in wireless sensor networks." Intelligent Computing, Communication and Devices. Springer, New Delhi, 2015. 1-15.

Raval, Private outlier detection and content based encrypted search. Diss. International Institute of Information Technology Hyderabad, 2012, 74 pages.

* cited by examiner

EFFICIENT UNSUPERVISED ANOMALY DETECTION ON HOMOMORPHICALLY ENCRYPTED DATA

BACKGROUND

Aspects of the present disclosure relate to detecting anomalous data in encrypted data sets, and more specifically to techniques for detecting anomalous data in encrypted data sets without decrypting the underlying encrypted data.

Internet of Things (IoT) devices may generate a significant amount of data for analysis. The data captured and recorded by IoT devices may include various types of data, some of which may be confidential. For example, in an industrial environment, IoT devices may record environmental and other process-related data, such as processing temperature, pressure, and time, ambient environmental information, and other information that, if revealed, may reveal protected information about various industrial processes. In another example, in a medical environment, IoT devices may record information that is subject to legally-imposed privacy requirements (e.g., HIPAA). As another example, IoT devices in a power generating station may expose information such as turbine runtime, total power generated, and other information that should not be exposed outside of the power generating station.

Because IoT devices generally have limited storage capabilities and data from an individual IoT device may not provide usable, actionable insights, the data generated by IoT devices may be transmitted to another location for storage. In some cases, this location may be a cloud data store in which storage space is shared among multiple customers. To protect the IoT data from being exposed, owners of IoT devices may encrypt the data prior to committing the data to a cloud data store. Generally, by encrypting data, parties without the appropriate key to decrypt the data (e.g., the cryptographic key used to encrypt the data in a symmetric key algorithm, the private key component of a public-private key pair, etc.) may be practically prevented from decrypting the encrypted data. For example, assuming a cryptographic algorithm that is not cryptographically broken (i.e., an algorithm for which a brute force attack is practical or for which a brute force attack is impractical but weaknesses exist that allow for data to be decrypted using less keys than the size of a key space), 2keySize operations may be required to decrypt the data using a brute force attack. Because a brute force attack on cryptographic schemes with large key sizes is computationally impractical, data encrypted using these cryptographic schemes is generally secure.

While data encryption may preserve the privacy of the underlying data, typical cryptographic schemes (e.g., AES, Blowfish, etc.) may not allow for operations to be performed on the underlying data without decrypting the data. Because decrypting data in order to train a model to identify anomalous data indicative of potential problems with an IoT device by definition exposes the underlying data to attack, other cryptographic schemes may need to be used in order to generate the model. These cryptographic schemes generally are homomorphic encryption algorithms that allow for some mathematical operations to be performed on the underlying data. While homomorphic encryption techniques allow for mathematical operations to be performed on the underlying data without decrypting encrypted data, a system performing mathematical operations on homomorphically encrypted data may not be able to easily perform other operations on the homomorphically encrypted data, such as splitting a data set into portions greater than a given value and less than the given value.

SUMMARY

One aspect of the present disclosure provides a method for determining whether encrypted data is potentially anomalous with respect to an encrypted data set. The method generally includes receiving a data set of encrypted data points, wherein each data point includes a plurality of encrypted features, and wherein the data set of encrypted data points is sorted for each encrypted feature into a sequence from smallest to largest values for a respective encrypted feature. A tree data structure having a number of levels is generated for the data set. Each level of the tree data structure generally corresponds to one of the encrypted plurality of features and includes a plurality of nodes. The tree data structure is generated for each respective level of the tree data structure by computing weights representing a probability of an imaginary split value being present in an interval of values for a respective encrypted feature corresponding to the respective level, and calculating, for each data point, a probability that the respective data point belongs to a left child node and a right child node relative to a parent node in a higher level of the tree data structure, the left child node corresponding to feature values less than the split value and the right child node corresponding to feature values greater than the split value. A first data point is received for analysis, and the first data point is determined to be potentially anomalous using the generated tree data structure.

Another aspect of the present disclosure provides a system for determining whether encrypted data is potentially anomalous with respect to an encrypted data set. The system generally includes a processor and a memory having instructions which, when executed by the processor, performs an operation for detecting anomalous data in an encrypted data set. The operation generally includes receiving a data set of encrypted data points, wherein each data point includes a plurality of encrypted features, and wherein the data set of encrypted data points is sorted for each encrypted feature into a sequence from smallest to largest values for a respective encrypted feature. A tree data structure having a number of levels is generated for the data set. Each level of the tree data structure generally corresponds to one of the encrypted plurality of features and includes a plurality of nodes. The tree data structure is generated for each respective level of the tree data structure by computing weights representing a probability of an imaginary split value being present in an interval of values for a respective encrypted feature corresponding to the respective level, and calculating, for each data point, a probability that the respective data point belongs to a left child node and a right child node relative to a parent node in a higher level of the tree data structure, the left child node corresponding to feature values less than the split value and the right child node corresponding to feature values greater than the split value. A first data point is received for analysis, and the first data point is determined to be potentially anomalous using the generated tree data structure.

Still another aspect of the present disclosure provides a computer-readable medium having instructions stored thereon which, when executed by a processor, performs an operation for determining whether encrypted data is potentially anomalous with respect to an encrypted data set. The operation generally includes receiving a data set of encrypted data points, wherein each data point includes a plurality of encrypted features, and wherein the data set of encrypted data points is sorted for each encrypted feature into a sequence from smallest to largest values for a respective encrypted feature. A tree data structure having a number of levels is generated for the data set. Each level of the tree data structure generally corresponds to one of the encrypted plurality of features and includes a plurality of nodes. The tree data structure is generated for each respective level of the tree data structure by computing weights representing a probability of an imaginary split value being present in an interval of values for a respective encrypted feature corresponding to the respective level, and calculating, for each data point, a probability that the respective data point belongs to a left child node and a right child node relative to a parent node in a higher level of the tree data structure, the left child node corresponding to feature values less than the split value and the right child node corresponding to feature values greater than the split value. A first data point is received for analysis, and the first data point is determined to be potentially anomalous using the generated tree data structure.

DETAILED DESCRIPTION

Isolation forests are a class of algorithms that may be used to identify outliers in a data set. Generally, an outlier in a data set is a data point that deviates sufficiently from other data points such that the deviation indicates a possibility that the data point was generated by a different device or device in an abnormal state. For example, given a cluster of data plotted on an graph with the center of the cluster at the middle of the graph, an outlier may be a data point that has a distance from the center of the graph exceeding some threshold difference. In another example, an outlier may be a data point that does not follow a trend of a shape generated from the other data points. In an isolation forest, an isolation forest tree may be generated based on a comparison of a value of a feature in each data point to a defined value so that the data points can be divided into a left node corresponding to data points that are less than the defined value and a right node corresponding to data points that are greater than or equal to the defined value. This operation generally entails the execution of O(n) comparison operations.

Additional complications arise with the execution of the O(n) comparison operations when data is encrypted. For example, comparison operations on homomorphically encrypted data may be an expensive task, as these operations are performed at the bit level, which may require maintaining both a binary and a decimal representation of the data used to generate the isolation forest tree. Further, in homomorphic encryption schemes, the results of any calculation are also encrypted (by virtue of being the effect of the result of mathematical operations being performed on data in the encrypted data space). Because the underlying data and the results of the comparison operations are both encrypted, partitioning an encrypted data set becomes a more computationally difficult task to perform.

Aspects of the present disclosure provide efficient techniques for generating an isolation forest tree and using the isolation forest tree to identify anomalous data out of the encrypted training data set and as records of new events are logged. By using a fuzzy data partition, as discussed in further detail below, aspects of the present disclosure allow for the number of matching operations and computationally intensive decryption of data to be performed without performing an exhaustive comparison between a universe of documents. By practically splitting and filtering an encrypted data set using a probability distribution over a given data point, computationally complex comparison operations on encrypted data may be replaced by probability distributions generated for a plurality of encrypted features, which may accelerate the process of generating an isolation forest tree, determining whether data points correspond to anomalous data, and taking action with respect to devices that generate anomalous data.

Figure 1:
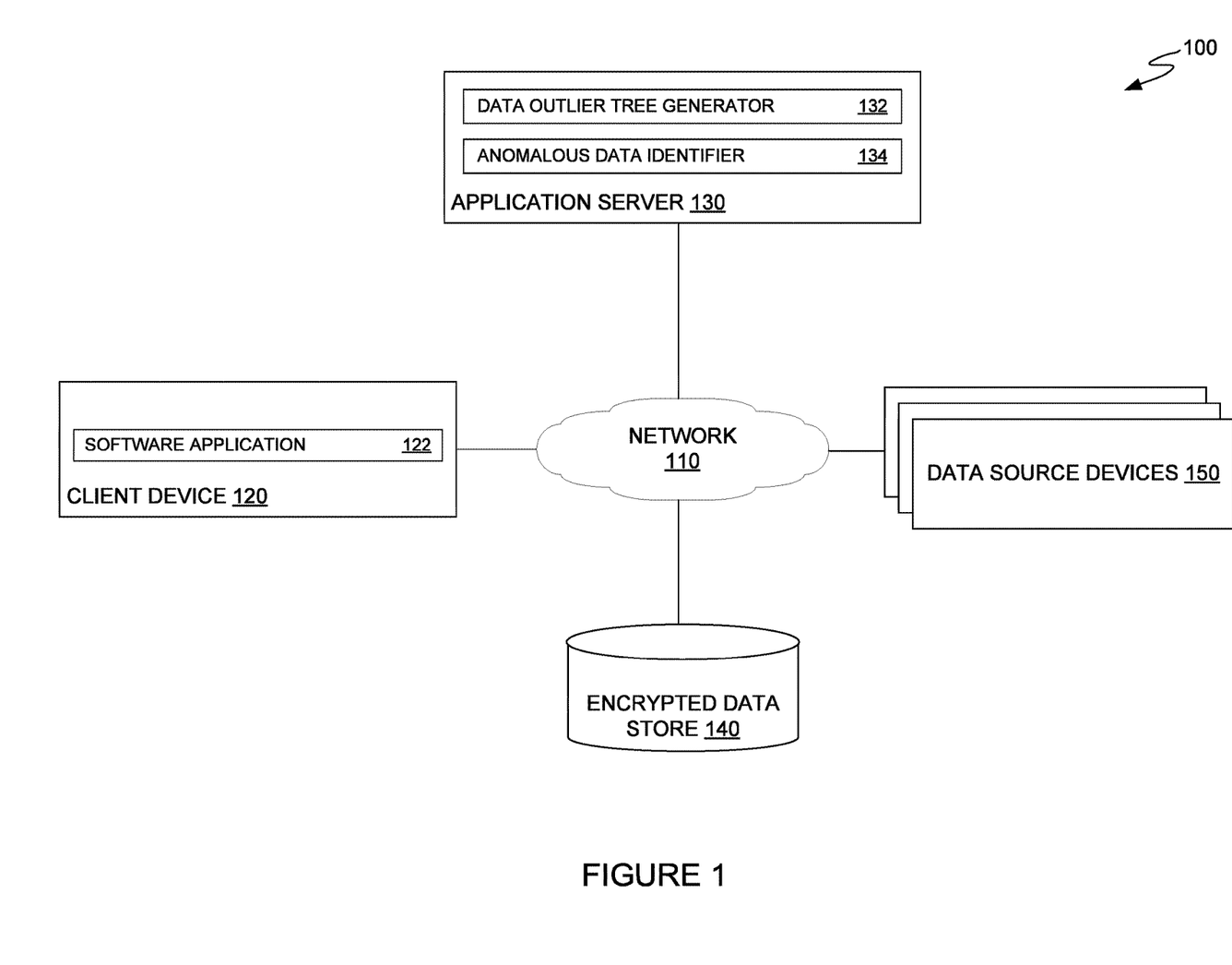
FIG. 1 illustrates an example networked computing environment in which tree data structures are generated from encrypted data points from a plurality of data source devices and used to identify anomalous data generated by the data source devices, according to one embodiment.

FIG. 1 illustrates an example networked computing environment in which tree data structures are generated from homomorphically encrypted data and used to determine whether other homomorphically encrypted data corresponds to anomalous data, according to an embodiment of the present disclosure. As illustrated, computing environment 100 includes a client device 120, an application server 130, an encrypted data store 140, and a plurality of data source devices 150.

Client device 120 is generally representative of computing devices on which a user can access a service executing on application server 130 to generate a tree data structure from a data set of homomorphically encrypted data and use the generated tree structure to identify anomalous data generated by a data source device 150. As illustrated, client device includes a software application 122.

Software application 122 generally provides an interface through which a user can invoke tree generation operations at application server 130 and use the generated tree to identify anomalous data from one or more data source devices 150. In some embodiments, software application 122 may be or include components of a Supervisory Control and Data Acquisition (SCADA) system in which data is retrieved from data source devices 150, processed, and stored in encrypted data store 140 for future analysis. In some embodiments, software application 122 may be a web browser or other application that allows a user to interact with an application hosted remotely on application server 130.

In some embodiments, software application 122 can sort the encrypted data set of encrypted data points used to generate a tree data structure that can be used to determine whether a data source device 150 is generating potentially anomalous data, as discussed in further detail below. Because the data points in the encrypted data set are homomorphically encrypted, mathematical operations can be performed to sort the data set of data points d without needing to decrypt the underlying data. Various sorting mechanisms can be used by software application 122 to sort data points based on the encrypted values for feature f, such as bubble sort, odd-even merge sort, insertion sort, or other sorting mechanisms that may provide high performance (e.g., a worst case time complexity better than $n^2$).

Application server 130 generally uses encrypted data from data source devices 150 owned by a user of software application 122 to generate a tree data structure that can be used to determine whether a data source device 150 is generating potentially anomalous data. Generally, identifying that a data source device 150 is generating potentially anomalous data may prompt software application 122 and/or application server 130 to take one or more remedial actions with respect to the data source device, such as disconnecting the data source device 150 from a network, halting activity at the data source device 150 to prevent damage from occurring to the data source device 150 or to the environment in which the data source device 150 operates, and the like. As illustrated, application server 130 includes a data outlier tree generator 132 and an anomalous data identifier 134.

Data outlier tree generator 132 generally uses a data set of previously collected data from one or more data source devices 150 owned by a user of the application hosted by application server 130 to generate a tree data structure that can be used to identify whether data generated by a data source device is potentially anomalous (and thus, indicative of potential problems at a data source device). Data outlier tree generator 132 can obtain this data from an encrypted data store 140 as a data set of n data points $\{d_1, d_2, d_3, \ldots, d_n\}$, with each entry having a number m of features $\{f_1, f_2, f_3, f_m\}$, and with each data point being encrypted using a homomorphic encryption scheme.

Data outlier tree generator 132 begins assembling the tree by establishing a root node. The root node includes every data point d in the data set of n data points, such that any data point d has a probability of being included in the root node equal to 1. Subsequently, data outlier tree generator selects a random feature f for analysis to create two child nodes from the root node.

The two child nodes from the root node may be referred to as a left node and a right node. As discussed in further detail below, the left node generally corresponds to a probability distribution that a feature value is less than an arbitrarily selected split value (a "left node probability distribution"). Meanwhile, the right node generally corresponds to a probability distribution that the feature value is greater than or equal to the arbitrarily selected split value (a "right node probability distribution"). To generate the left node probability distribution and the right node probability distribution, data outlier tree generator 132 orders the data set of data points d according to the value of feature f for each data point d.

Once data points d are sorted based on the values of feature f data outlier tree generator 132 performs a fuzzy split of the root node based on the minimum value $$m = \min_{d_k \in D_{enc}} f_i(d_k)$$

and maximum value $$M = \max_{d_k \in D_{enc}} f_i(d_k)$$

of feature f. A probability that a data point $d_k$ belongs to the left node may be represented by the equation $$P^{\rho \ell} = \frac{M - f_i(d_k)}{M - m},$$

which results in an encrypted probability value that data point $d_k$ belongs to the left node. A probability that the data point $d_k$ belongs to the right node may thus be calculated according to the equation $P^{pr}=\text{Enc}(1)-P^{\rho \ell}$. Generally, the probability $P^{\rho \ell}$ represents a probability that an arbitrarily chosen split value that is greater than $d_k$ exists, and the probability $P^{pr}$ represents a probability that an arbitrarily chosen split value that is less than $d_k$ exists.

After performing a fuzzy split of the root node, data outlier tree generator can perform a fuzzy split for any number of subsequent features f and extend the length of the tree thusly. In some embodiments, the tree may have an arbitrarily set depth. In some embodiments, the arbitrarily set depth may be less than the number of features f included in each data point. The arbitrarily set depth may have a depth corresponding to the number of features f included in each data point. In still further cases, the arbitrarily set depth may have a depth greater than the number of features f included in each data point. In any embodiment, the data outlier tree may be structured such that any given feature f can be considered at one level or multiple levels of the data outlier tree. Because the probabilistic membership of the left and right nodes may be encrypted, the minimum and maximum range of the members of the left and right nodes may not be calculated as discussed above with respect to splitting the data set at the root node into a left child node and right child node for a first feature f. Thus, data outlier tree generator 132 can compute the probability that a data point $d_k$ belongs to a left child node or a right child node based on a weight function and a randomly chosen split value. The weight function W generally assigns a weight value to a split value in the interval $(d_i, d_{i+1})$. Generally, the weight function W may be defined as the product of two functions, $W_i(d_i)$ and $W^r(d_i)$. $W^l(d_i)$ may be defined according to the equation $$W^l(d_i) = \frac{\sum_{k \leq i} P^\eta[d_k]^2}{(\sum_{k \leq i} P^\eta[d_k])^2}$$

such that the value of $W^l(d_i)$ is approximately 0 if there is no "high" probability point to the left of the split value $d_i$ (i.e., there are no high-probability points with a value less than $d_i$) and approximately 1 if there is at least one "high" probability point to the left of the split value $d_i$. Meanwhile, $W^r(d_i)$ may be defined according to the equation $$W^r(d_i) = \frac{\sum_{k \geq i} P^\eta[d_k]^2}{(\sum_{k \geq i} P^\eta[d_k])^2}.$$

In a first scenario where there is a point with a probability 1 and n−1 points with probability 0 to the left of $d_i$, $W^l(d_i)=1$.

In a second scenario where there are n points with probability 1/n to the left of $d_i$, $W^l(d_i)=1/n$.

Given the weight function W, the conditional probability of a point $d_k$ belonging to the left child node may be represented by the equation $$P^{\eta l}[d_k \mid d_k \in \eta] = \frac{\sum_{i \geq k} W_i(f_j(d_{i+1}) - f_j(d_i))}{\sum_{i=1}^{n-1} W_i(f_j(d_{i+1}) - f_j(d_i))}.$$

Correspondingly, the conditional probability of a point $d_k$ belonging to the right child node may be represented by the equation $P^{\eta r}[d_k \mid d_k \in \eta] = \text{Enc}(1) - P^{\eta l}[d_k \mid d_k \in \eta]$.

After the tree has been generated for the selected number of levels in the data outlier tree, data outlier tree generator 132 can deploy the tree to anomalous data identifier 134 or software application 122 implementing an anomalous data identifier at client device 120 for use in identifying anomalous data from a data source device 150. Anomalous data identifier 134 generally encrypts the associated probabilities at each node of the tree with the cryptographic key used to encrypt the user's data at encrypted data store 140. For each node n of the tree, anomalous data identifier examines the expected number of data points. The expected number of data points may be represented by the equation $S_\eta = \sum_{d_i \in D} P^\eta [d_i]$. If $S_\eta \leq 1+\epsilon$, where $\epsilon$ is a small constant and $\epsilon > 0$, anomalous data identifier 134 can prune the tree by removing all of the child nodes for which the node n is, directly or indirectly, the parent node. By pruning the tree, anomalous data identifier 134 can reduce the size of the tree and make paths to potentially anomalous data shorter than paths to non-anomalous data.

Anomalous data identifier 134 can subsequently receive an encrypted data point d including the features f that was not included in the data set used to generate the tree data structure. Using the encrypted data point, anomalous data identifier 134 generates an anomaly score s for the data point in the generated tree data structure. The anomaly score s for a data point d may be represented by the equation $$s(d) = 2^{\frac{-E(h(d))}{c(n)}},$$

where E(h(d)) is the expected distance from the root node of the tree to the leaf in the tree containing point d, and n is the total number of nodes present in the tree. E(h(d)) may be represented by the equation $E(h(d)) = \sum_{Leaf\ j \in T_i} \ell\ P^j[d]$, and c(n) may be represented by the equation $$c(n) \leftarrow 2\ln n - \left(\frac{2(n-1)}{n}\right).$$

To generate the anomaly score, anomalous data identifier 134 can traverse each path in the pruned tree data structure to identify a probability that the received encrypted data point belongs to a specific terminal leaf node in the pruned tree data structure (i.e., a node for which no children exist, such as the last node of a pruned branch of the tree data structure or a node in the lowest level of the tree data structure). The probability that a data point d belongs to a node n may be a conditional probability generated from the probability that d belongs to n and the parent node of n, and may be represented by the equation $P^\eta[d \mid d$ belongs to parent of $\eta] =$ $$\frac{(P^\eta[d_f^2])(f_j(d_f^1) - v_f) + P^\eta[d_f^1](f_j(d_f^2) - v_f))}{((f_j(d_f^1) - v_f) + (f_j(d_f^2) - v_f))}$$

The probability of d belong to any node n, with any given parent node $n^+$, may be represented by the recursive formula $P^\eta[d] = P^\eta[d \mid d$ belongs to $n^+]P^{n^+}[d]$. Anomalous data identifier 134 can choose the node having the highest probability value to use in calculating the anomaly score according to the equations discussed above.

Generally, anomaly scores for a data point d may indicate a likelihood that the data point d is different from the data used to generate the tree data structure by some threshold amount. If the anomaly score s exceeds a threshold value, which may be a user-defined value, anomalous data identifier 134 can identify the received data point as corresponding to potentially anomalous data and can take action with respect to the data source device 150 that generated the data point d. The action undertaken with respect to the data source device 150 that generated the data point d may be user-defined based on the environment in which the data source device operates. For example, anomalous data identifier 134 can generate an alert or other notification to a user of the client device 120 to indicate that the data source device 150 may have malfunctioned. In some cases, where the data source device 150 periodically generates data, anomalous data identifier 134 can instruct the data source device to continue to report data to the application server 130 for analysis but not transmit the data to the encrypted data store 140 so that subsequent generation of a tree data structure is not influenced by anomalous data. In still further cases, anomalous data identifier 134 can take one or more actions to disconnect data source device 150 from network 110 or otherwise halt operations at data source device 150 to prevent damage from occurring to the data source device 150 and/or the environment in which the data source device 150 operates.

It should be recognized that data outlier tree generator 132 and anomalous data identifier 134, while illustrated as executing on application server 130, may be distributed across different computing entities in the networked computing environment. In some embodiments, for example, data outlier tree generator 132 may operate on a remote application server, while anomalous data identifier 134 may execute on a client device 120 using a tree data structure generated by data outlier tree generator 132. In another embodiment, data outlier tree generator 132 and anomalous data identifier 134 may be part of software application 122 executing locally on client device 120.

Encrypted data store 140 generally stores homomorphically encrypted data generated by data source devices 150 that may be used by data outlier tree generator 132 to generate a tree data structure for use in determining whether subsequently generated data corresponds to anomalous or potentially anomalous data. Encrypted data store 140 may, for example, be partitioned on a per-user basis so that data associated with one user is not comingled with data associated with other users. Encrypted data store 140 may be, for example, a relational database, a non-relational database, a flat data store, etc. in which the data generated by data source devices 150 is stored.

Data source devices 150 are generally illustrative of various devices that can record operational and other data, encrypt the recorded data, and transmit the encrypted data to a remote server for analysis. Data source devices 150 may be referred to as Internet of Things devices and may be deployed in various environments, such as in a user's home, in medical facilities, in industrial facilities, and so on. The data generated by data source devices 150 may depend on the environment in which these devices operate and how these devices are configured.

Figure 2:
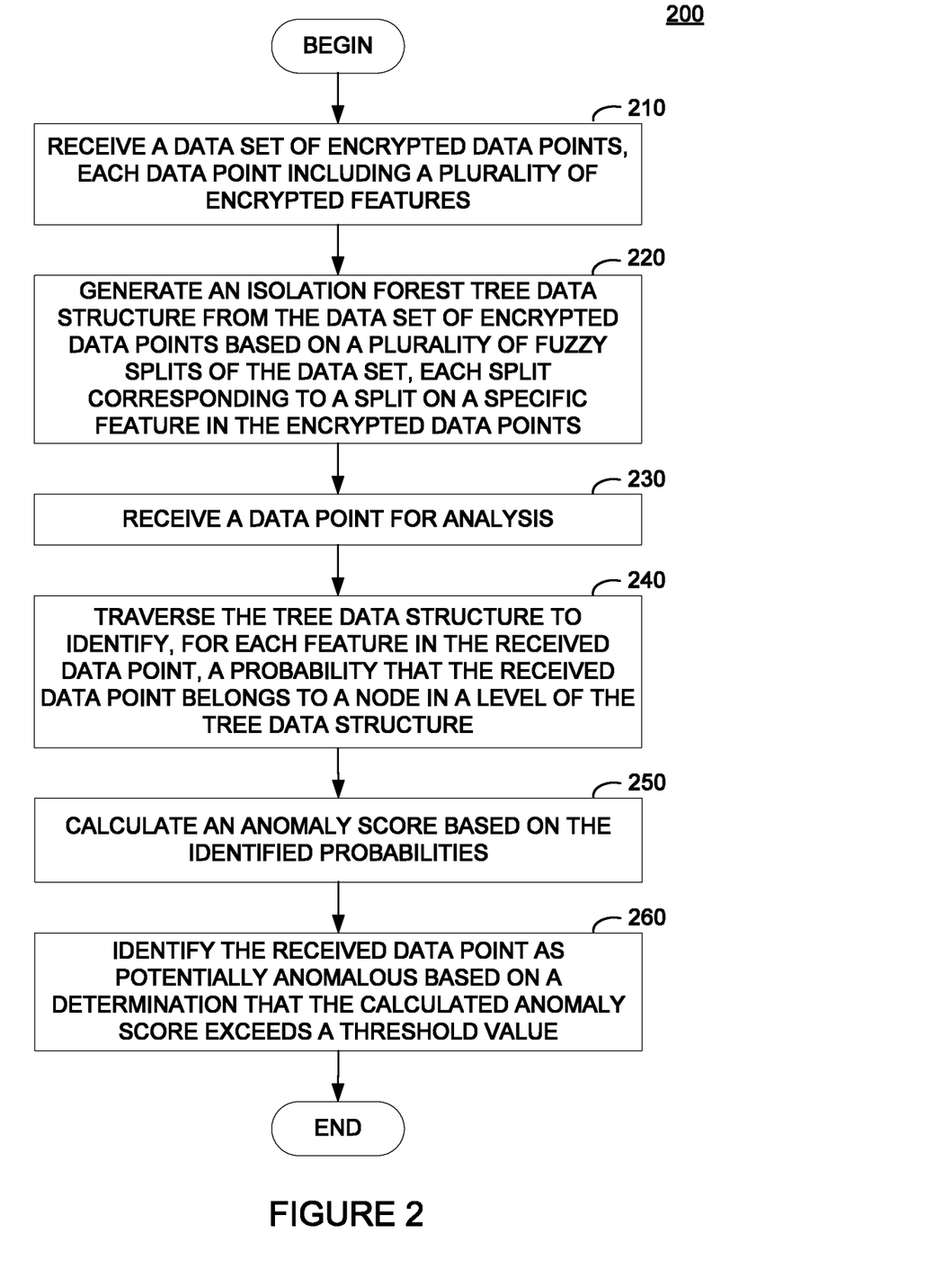
FIG. 2 illustrates example operations for identifying anomalous data using a tree data structure generated from encrypted data points, according to one embodiment.

FIG. 2 illustrates example operations that may be performed by a system to identify recorded encrypted data points as potentially anomalous data, according to an embodiment. As illustrated, operations 200 begin at block 210, where the system receives a data set of encrypted data points d. Each data point includes a plurality of encrypted features f. As discussed, the encrypted data points may correspond to data obtained from one or more data source devices 150 and stored in encrypted data store 140. The encrypted data points may be encrypted using a homomorphic encryption algorithm, which allows for various mathematical operations to be performed on the encrypted data points without needing to decrypt the encrypted data points and recover the underlying data.

At block 220, the system generates an isolation forest tree data structure from the data set of encrypted data points. The isolation forest tree data structure may be generated based on a plurality of fuzzy splits of the data set, and each of the plurality of fuzzy splits may correspond to a split on a particular feature in the encrypted data points. As discussed, the isolation forest data tree may be built from a root node including each of the plurality of data points. A first split may be performed based on a minimum and maximum value of a specific feature. Subsequent splits, represented by lower-level nodes in the tree data set, may be split based on a weighted probability that a data point has a feature less than or greater than a selected split value. Levels of nodes, corresponding to different features in the data set, may be added to the isolation forest tree data structure until each feature has been added to the isolation forest tree data structure or a threshold number of features have been added to the isolation forest tree data structure. Because a split may not be performed on data points beyond the level of the tree corresponding to the first selected feature, each child node below the level of the tree corresponding to the first selected feature may model a split as a probability that a feature value is less than or greater than a selected split value. As a result, prior to any pruning operations that may be performed on the isolation forest tree data structure, the tree data structure may include 2feature_number nodes at each level of the tree (e.g., a root node with 1 node (feature 0), a first level with 2 nodes representing a left/right split of the data points on a first feature f1, a second level with 4 nodes represent left/right splits of the data points on a second feature f2 relative to the left/right split of the data points on the first feature f1, and so on).

At block 230, the system receives a data point for analysis. The received data point generally is received from one of a plurality of data source devices 150 and includes data that was not included in the data set used to generate the isolation forest tree data structure at block 220. As discussed, the received data point may also be encrypted to preserve the security and privacy of the information included in the data point, and operations may be performed on the data point without decrypting the received data point and exposing sensitive data to attack.

At block 240, the system traverses the tree data structure to identify, for each feature in the received data point, a probability that the received data point belongs to a node in a level of the tree data structure. As discussed, traversing the tree data structure may be performed recursively to identify a probability that a data point d belongs to each terminal node in the tree data structure as a conditional probability that the data point d belongs to a terminal node and its parent node.

At block 250, the system calculates an anomaly score based on the identified probabilities. The node having the highest calculated probability of including the received data point may be the selected node used to calculate the anomaly score. As discussed, the anomaly score may be calculated based on the length of a path from the root node of the tree data structure to the selected node and the total number of nodes in the tree. Shorter paths from the root node to the selected node may indicate that the received data point is anomalous, while longer paths from the root node to the selected node may indicate that the received data point fits within the pattern of data previously received from the data source device.

At block 260, the system identifies the received data point as potentially anomalous based on a determination that the calculated anomaly score exceeds a threshold value. Based on the identification of the received data point as potentially anomalous, the system can take one or more actions with respect to the data source device that generated the received data point. For example, the actions may include discontinuing recording data at the data source device until the data source device is repaired or replaced, discontinuing operations at the data source device, and the like.

Figure 3:
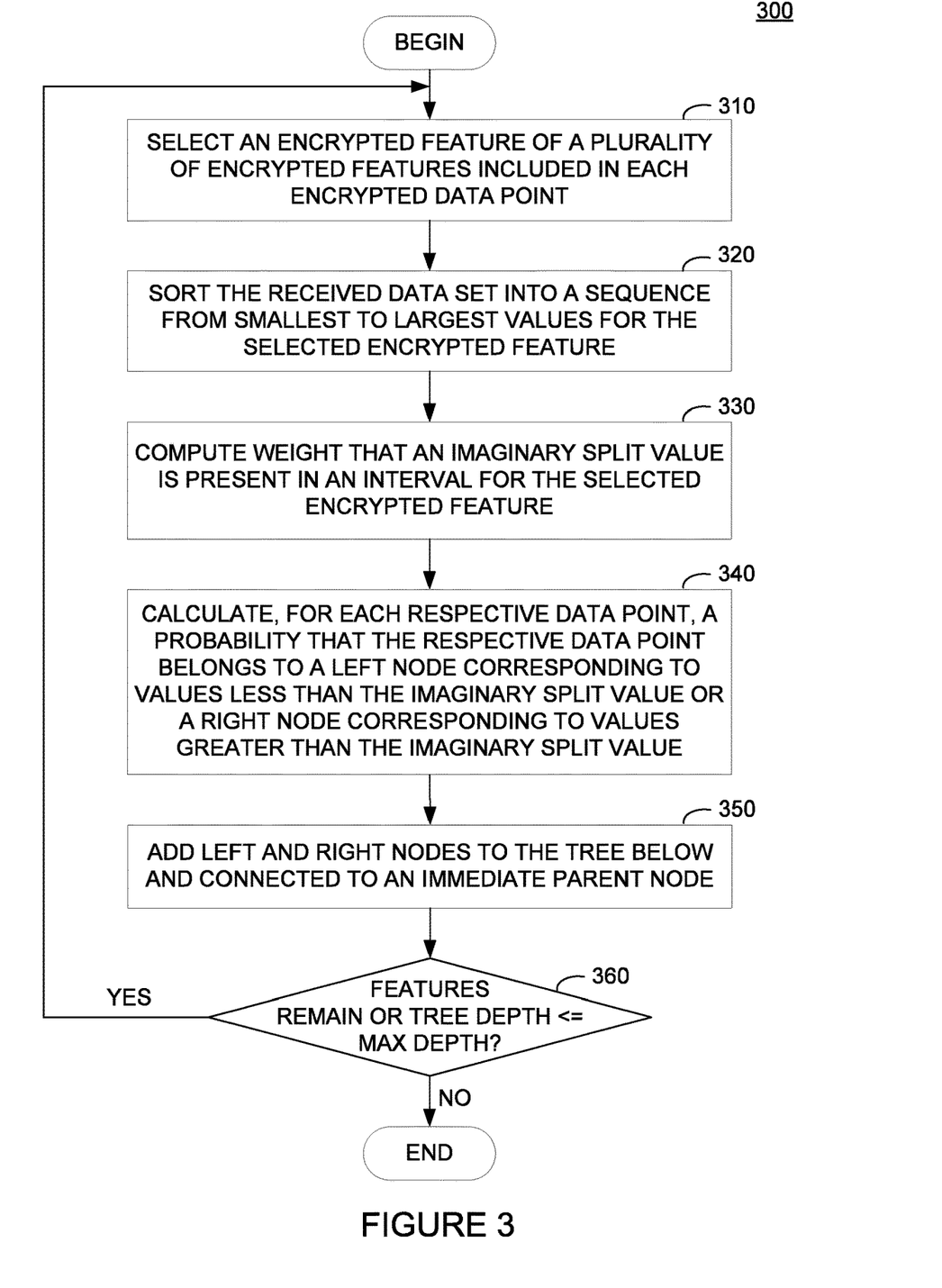
FIG. 3 illustrates example operations for generating a tree data structure from encrypted data points for identifying anomalous data generated by a data source device, according to one embodiment.

FIG. 3 illustrates example operations that may be performed by a system to build a tree data structure that can be used to determine whether received, encrypted, data points correspond to potentially anomalous data, according to an embodiment. As illustrated, operations 300 begin at block 310, where the system selects an encrypted feature of a plurality of encrypted features included in each encrypted data point in a data set.

At block 320, the system sorts the received data set into a sequence from smallest to largest values for the selected encrypted feature. As discussed, because the encrypted data points (and thus, the encrypted features) are generally encrypted using homomorphic encryption techniques, mathematical operations may be performed on the encrypted data points without decrypting the data points and recovering the underlying data.

At block 330, the system assumes the existence of an imaginary split value for the encrypted feature and calculates a weight, for the imaginary split value, corresponding to a likelihood that the imaginary split value is present in an interval for the encrypted feature. The weight value may be calculated based on a weighting function that assigns a weight to a splitter for the encrypted feature between a selected data point and the next data point in the data set. As discussed, the selection of an imaginary split value may be performed for nodes other than the root node, where containment probabilities for the left and right nodes corresponding to the first selected feature may be based on the minimum and maximum values for the first selected feature. For nodes other than the root node, the imaginary split value may be selected to allow for a fuzzy split of a data set where the system need not know whether a given data point belongs to the left or right node of the immediate parent node in the tree data structure.

At block 340, the system calculates, for each respective data point, a probability that the respective data point belongs to a left node corresponding to values less than the split value or a right node corresponding to values greater than the split value. Each node includes a probability distribution for the entirety of the data set, as the system may not have knowledge of which nodes actually belong in the parent node.

At block 350, the system adds left and right nodes to the tree below and connected to an immediate parent node. The left node generally represents the probability distribution over the entire data set that the feature value for each data point in the data set is less than the selected split value, and the right node generally represents the probability distribution over the entire data set that the feature value for each data point in the data set is greater than or equal to the selected split value.

At block 360, the system determines if features remain to be analyzed or if the depth of the tree data structure is less than or equal to a maximum tree depth. If features remain to be analyzed, or if the depth of the tree structure is less than or equal to a maximum tree depth, operations 300 can return to block 310, where another encrypted feature is selected for addition to the tree data structure. Otherwise, operations 300 may end, and the resulting tree data structure may be provided to an anomalous data identifier at an application server or a client device to determine whether newly generated data points from one or more data source devices corresponds to anomalous data and, if so, take action with respect to the one or more data source devices.

Figure 4:
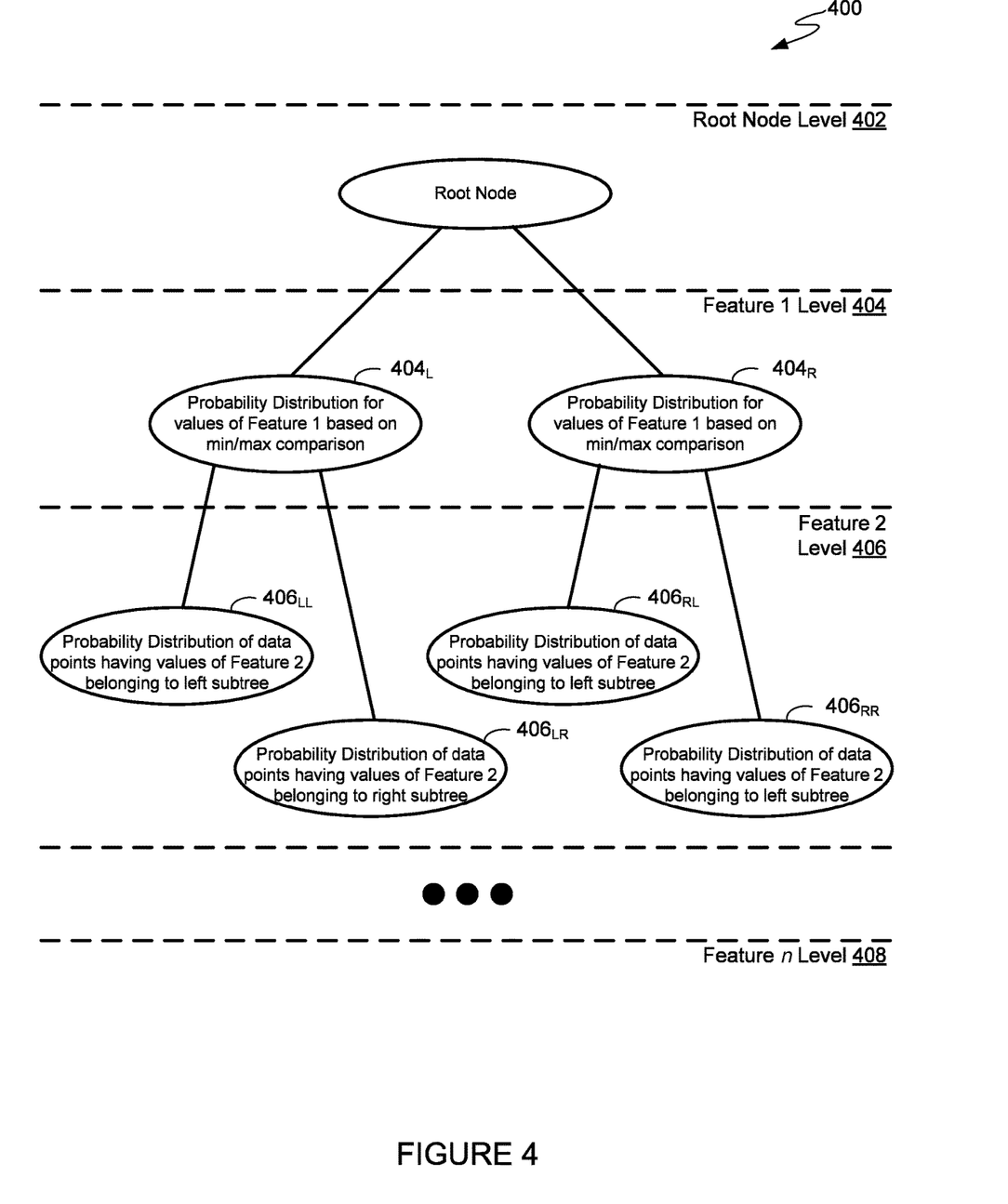
FIG. 4 illustrates an example tree data structure generated from encrypted data points for identifying anomalous data generated by a data source device, according to one embodiment.

FIG. 4 illustrates an example tree data structure 400 that may be generated from an encrypted data set and used to determine whether encrypted data points received from a data source device are potentially anomalous, according to an embodiment. As illustrated, tree data structure 400 includes a root node level 402 and a plurality of feature levels 404, 406, 408. Root node level 402 contains a single node representing the entirety of the data set used to generate tree data structure 400 such that each data point in the data set has a probability of belonging to the root node of 1.

Feature 1 level 404 represents a first split made on the data set using the sorted values of a first feature. As discussed, to perform the first split and generate left node $404_L$ and right node $404_R$, the system can perform a fuzzy split by calculating a left containment probability and a right containment probability based on the minimum and maximum values for the first feature in the data set. Because these features are generally homomorphically encrypted, the left and right containment probabilities may also be homomorphically encrypted as a result of performing mathematical operations on homomorphically encrypted values.

Feature 2 level 406 represents a second split made on the data set using the sorted values of a second feature. Because, as discussed, the system may not have information about which data points belong to left node $404_L$ and right node $404_R$, left/right nodes generated at feature 2 level 406 through feature n level 408 may be calculated as conditional probability distributions given an arbitrarily selected split value and a weight function. Left node $406_{LL}$ represents a probability distribution of a likelihood that a data point belongs to the left subtree from node $404_L$, while right node $406_{LR}$ represents a probability distribution of a likelihood that the data point belongs to the right subtree from node $404_L$. Likewise, left node $406_{RL}$ represents a probability distribution of a likelihood that a data point belongs to the left subtree from node $404_R$, while right node $406_{RR}$ represents a probability distribution of a likelihood that a data point belongs to the right subtree from node $404_R$. As discussed, the width of the tree may double for each subsequent feature added to the tree data structure, such that feature n level 408 includes $2^n$ nodes prior to any pruning that may occur.

Figure 5:
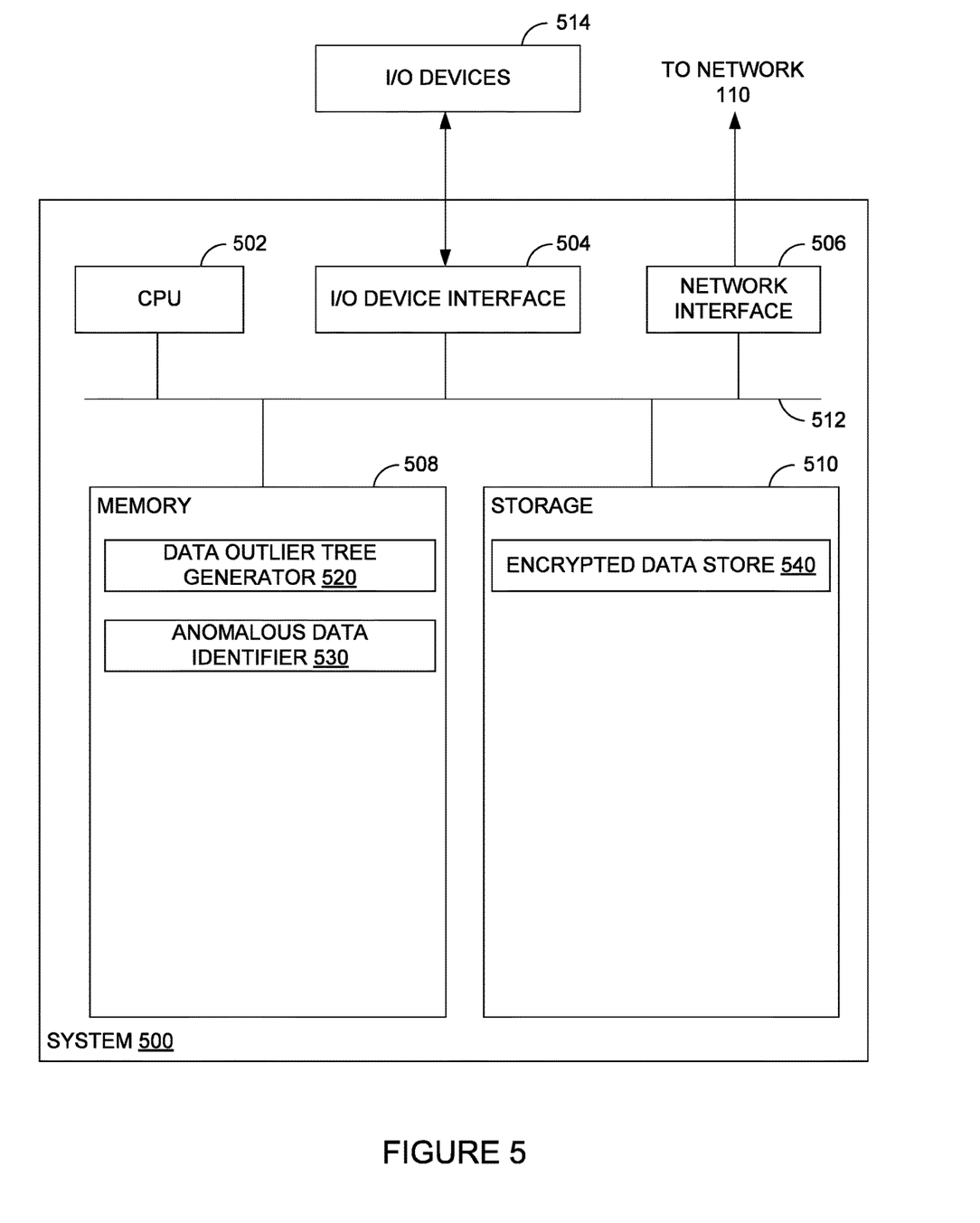
FIG. 5 illustrates an example system in which aspects of the present disclosure may be performed.

FIG. 5 illustrates an example system 500 that uses sets of encrypted data points including a plurality of encrypted features to generate an isolation forest tree data structure and uses the tree data structure to determine whether encrypted data received from a data source device is anomalous or potentially anomalous, according to an embodiment. As illustrated, system 500 includes, without limitation, a central processing unit 502, one or more I/O device interfaces 505, which may allow for the connection of various I/O devices 514 (e.g., keyboards, displays, mouse devices, pen input, etc.) to the entity analytics system 500, network interface 506, a memory 508, storage 510, and an interconnect 512.

CPU 502 may retrieve and execute programming instructions stored in the memory 508. Similarly, the CPU 502 may retrieve and store application residing in the memory 508. The interconnect 512 transmits programming instructions and application data among the CPU 502, I/O device interface 504, network interface 506, memory 508, and storage 510. CPU 502 is included to be representative of a single CPU, multiple CPUs, a single CPU having multiple processing cores, and the like. Additionally, the memory 508 is included to be representative of a random access memory. Furthermore, storage 510 may be a disk drive, a solid state drive, a phase change memory device, or the like. Although shown as a single unit, the storage 510 may be a combination of fixed and/or removable storage devices, such as fixed disc drives, solid state drives, removable memory cards or optical storage, network attached storage (NAS), or a storage area network (SAN).

As illustrated, memory 508 includes a data outlier tree generator 520 and an anomalous data identifier 530. Data outlier tree generator 520 generally takes a data set of encrypted data points d, with each data point including a set of features f and generates a tree data structure including conditional probabilities that a data point is less than or greater than an arbitrarily selected value for a plurality of features f. As discussed, to do so, data outlier tree generator 520 can sort the data points for each feature f such that for any given feature f the data points are ordered from smallest to largest. As discussed, because homomorphic encryption techniques may be used to encrypt the data points, the data points need not be decrypted in order for mathematical operations to be performed on the data points. A first split may be performed based on the minimum and maximum values for a first feature $f_1$, and subsequent splits may be performed based on a weight function and an arbitrarily selected split value for features $f_2$ through $f_n$, where n represents the total number of features included in a data point or a user-defined maximum tree depth.

Anomalous data identifier 530 generally uses the tree data structure generated by data outlier tree generator 520 to determine whether an encrypted data point received from a remote data source device (e.g., an IoT device) via network interface 506 corresponds to potentially anomalous data. Anomalous data identifier 530 can prune the tree data structure based on the probabilities determined for each node and use the pruned tree data structure to identify the node that the received encrypted data point belongs to. Based on the length of the path from the root node of the tree data structure to the identified node and the total number of nodes in the pruned data structure, anomalous data identifier 530 can calculate an anomaly score for the received encrypted data point. If the anomaly score for the received encrypted data point exceeds a threshold value, anomalous data identifier 530 can mark the received encrypted data point as potentially anomalous and take one or more actions with respect to the data source device from which the encrypted data point was received.

Storage 510, as illustrated, includes an encrypted data store 540. Encrypted data store 540 is generally illustrative of a data store in which encrypted data from multiple user devices may be stored for use by data outlier tree generator 520 in generating a tree data structure used by anomalous data identifier 530 to determine whether data points received from a data source device correspond to potentially anomalous data. Encrypted data store 540 may be segregated on a per-user basis so that data from multiple users is not comingled. Encrypted data store 540 may be a relational database, a non-relational database, a flat file store, or any other data repository in which encrypted data may be stored and retrieved.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for determining whether encrypted data is potentially anomalous with respect to an encrypted data set, the method comprising:
   receiving a data set of encrypted data points, wherein each data point includes a plurality of encrypted features, and wherein the data set of encrypted data points is sorted for each encrypted feature into a sequence from smallest to largest values for a respective encrypted feature;
   generating, for the data set, a tree data structure having a number of levels, each level of the tree data structure corresponding to one of the encrypted plurality of features and including a plurality of nodes, wherein generating the tree data structure comprises:
   for each respective level in the tree data structure:
       computing weights representing a probability of an imaginary split value being present in an interval of values for a respective encrypted feature corresponding to the respective level, and
       calculating, for each data point, a probability that the respective data point should be assigned to a left child node and a right child node relative to a parent node in a higher level of the tree data structure, the left child node corresponding to feature values less than the split value and the right child node corresponding to feature values greater than the split value;
   receiving a first data point for analysis, the first data point including the plurality of encrypted features; and
   determining that the first data point is potentially anomalous using the generated tree data structure.

2. The method of claim 1, wherein determining that the first data point is potentially anomalous comprises:
   traversing the tree data structure to identify, for the plurality of the encrypted features, a probability that the first data point belongs to a node in a level of the tree data structure corresponding to each of the plurality of encrypted features;
   calculating an anomaly score for the first data point based on the probability identified for each of the plurality of encrypted features; and
   upon determining that the calculated anomaly score exceeds a threshold value, identifying the first data point as potentially anomalous data.

3. The method of claim 1, wherein:
   the number of levels in the tree is less than a number of the encrypted features included in the encrypted data point.

4. The method of claim 1, wherein the computed weight representing the probability of an imaginary split value being present in an interval of values for the respective encrypted feature comprises a weight calculated for a value of the respective encrypted feature in a selected encrypted data point and a value of the respective encrypted feature in a subsequent encrypted data point.

5. The method of claim 1, wherein calculating the probability that the respective data point should be assigned to the left child node is calculated as a proportion of an area of a curve corresponding to values in excess of the split value in a distribution of the data set to a total area of the curve corresponding to values in the data set.

6. The method of claim 5, wherein calculating the probability that the respective data point should be assigned to the right child node is calculated as a difference between 1 and the calculated probability that the respective data point belongs to the left node.

7. The method of claim 1, further comprising:
   decrypting probabilities associated with each node of the tree data structure; and
   for each respective node in the tree data structure:
       determining an expected number of data points associated with the respective node;
       determining that the expected number of data points associated with the respective node is less than a threshold value using the decrypted probabilities; and
       pruning the tree data structure to remove child nodes associated with the respective node from the tree data structure.

8. The method of claim 1, wherein the calculated anomaly score corresponds to an expected distance from a root node in the tree data structure to a node in the tree data structure containing the received data point.

9. The method of claim 1, wherein the encrypted data points, encrypted features of the encrypted data points, and the received data point are encrypted using a homomorphic encryption scheme such that mathematical operations can be performed on the encrypted data points, encrypted features of the encrypted data points, and the received data point without decrypting the encrypted data points and the received data point.

10. A system, comprising:
a processor; and
a memory having instructions stored thereon which, when executed by the processor, performs an operation for determining whether encrypted data is potentially anomalous with respect to an encrypted data set, the operation comprising:
receiving a data set of encrypted data points, wherein each data point includes a plurality of encrypted features, and wherein the data set of encrypted data points is sorted for each encrypted feature into a sequence from smallest to largest values for a respective encrypted feature;
generating, for the data set, a tree data structure having a number of levels, each level of the tree data structure corresponding to one of the encrypted plurality of features and including a plurality of nodes, wherein generating the tree data structure comprises:
for each respective level in the tree data structure:
computing weights representing a probability of an imaginary split value being present in an interval of values for a respective encrypted feature corresponding to the respective level, and
calculating, for each data point, a probability that the respective data point should be assigned to a left child node and a right child node of a parent node in a higher level of the tree data structure, the left child node corresponding to feature values less than the split value and the right child node corresponding to feature values greater than the split value;
receiving a first data point for analysis, the first data point including the plurality of encrypted features; and
determining that the first data point is potentially anomalous using the generated tree data structure.

11. The system of claim 10, wherein determining that the first data point is potentially anomalous comprises:
traversing the tree data structure to identify, for the plurality of the encrypted features, a probability that the first data point belongs to a node in a level of the tree data structure corresponding to each of the plurality of encrypted features;
calculating an anomaly score for the first data point based on the probability identified for each of the plurality of encrypted features; and
upon determining that the calculated anomaly score exceeds a threshold value, identifying the first data point as potentially anomalous data.

12. The system of claim 10, wherein:
the number of levels in the tree is less than a number of the encrypted features included in the encrypted data point.

13. The system of claim 10, wherein the computed weight representing the probability of an imaginary split value being present in an interval of values for the respective encrypted feature comprises a weight calculated for a value of the respective encrypted feature in a selected encrypted data point and a value of the respective encrypted feature in a subsequent encrypted data point.

14. The system of claim 10, wherein calculating the probability that the respective data point belongs to the left child node is calculated as a proportion of an area of a curve corresponding to values in excess of the split value in a distribution of the data set to a total area of the curve corresponding to values in the data set.

15. The system of claim 14, wherein calculating the probability that the respective data point belongs to the right child node is calculated as a difference between 1 and the calculated probability that the respective data point belongs to the left node.

16. The system of claim 10, wherein the operation further comprises:
decrypting probabilities associated with each node of the tree data structure; and
for each respective node in the tree data structure:
determining an expected number of data points associated with the respective node;
determining that the expected number of data points associated with the respective node is less than a threshold value using the decrypted probabilities; and
pruning the tree data structure to remove child nodes associated with the respective node from the tree data structure.

17. The system of claim 10, wherein the calculated anomaly score corresponds to an expected distance from a root node in the tree data structure to a node in the tree data structure containing the received data point.

18. The system of claim 10, wherein the encrypted data points, encrypted features of the encrypted data points, and the received data point are encrypted using a homomorphic encryption scheme such that mathematical operations can be performed on the encrypted data points, encrypted features of the encrypted data points, and the received data point without decrypting the encrypted data points and the received data point.

19. A computer-readable medium having instructions stored thereon which, when executed by a processor, performs an operation for determining whether encrypted data is potentially anomalous with respect to an encrypted data set, the operation comprising:
receiving a data set of encrypted data points, wherein each data point includes a plurality of encrypted features, and wherein the data set of encrypted data points is sorted for each encrypted feature into a sequence from smallest to largest values for a respective encrypted feature;
generating, for the data set, a tree data structure having a number of levels, each level of the tree data structure corresponding to one of the encrypted plurality of features and including a plurality of nodes, wherein generating the tree data structure comprises:
for each respective level in the tree data structure:
computing weights representing a probability of an imaginary split value being present in an interval of values for a respective encrypted feature corresponding to the respective level, and
calculating, for each data point, a probability that the respective data point should be assigned to a left child node and a right child node of a parent node in a higher level of the tree data structure, the left child node corresponding to feature values less than the split value and the right child node corresponding to feature values greater than the split value;

receiving a first data point for analysis, the first data point including the plurality of encrypted features; and determining that the first data point is potentially anomalous using the generated tree data structure.

20. The computer-readable medium of claim 19, wherein determining that the first data point is potentially anomalous comprises:

traversing the tree data structure to identify, for the plurality of the encrypted features, a probability that the first data point belongs to a node in a level of the tree data structure corresponding to each of the plurality of encrypted features;

calculating an anomaly score for the first data point based on the probability identified for each of the plurality of encrypted features; and upon determining that the calculated anomaly score exceeds a threshold value, identifying the first data point as potentially anomalous data.

* * * * *